Figure 1A:
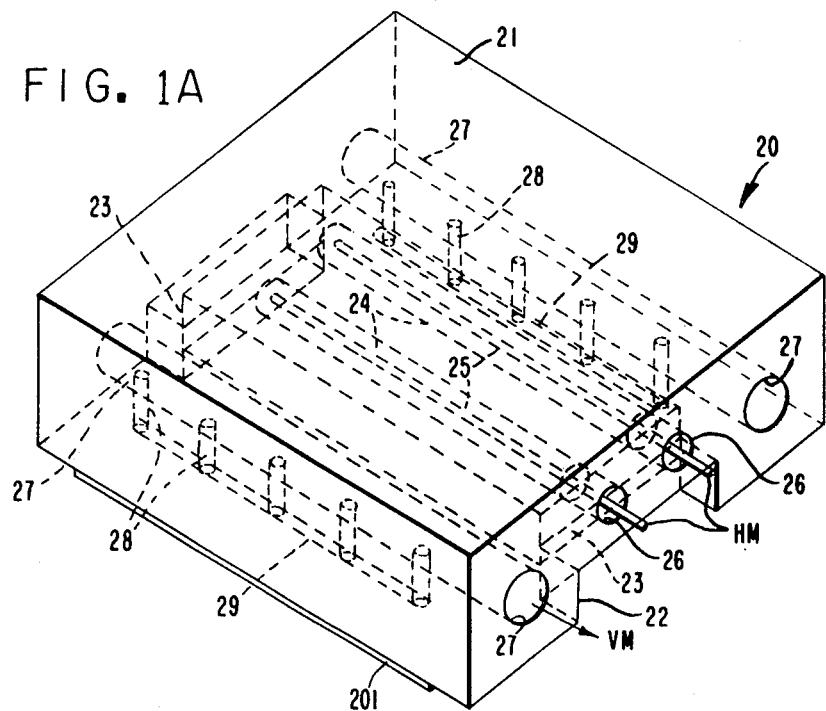
Figure 1B:
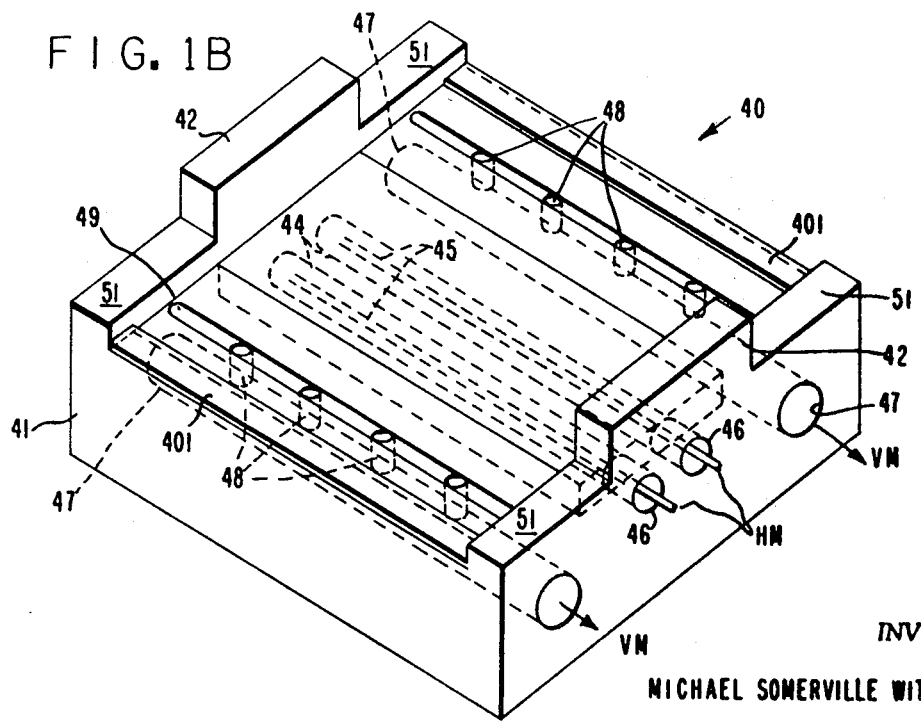
Figure 2:
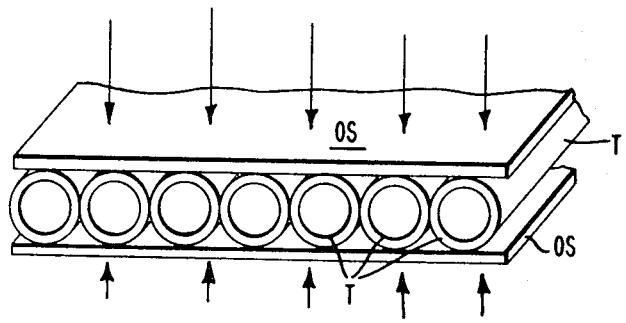
Figure 3:
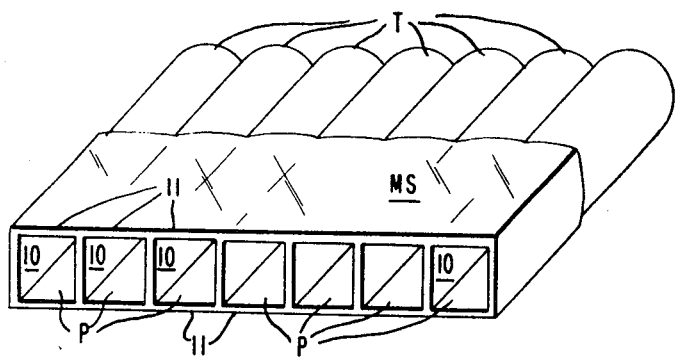
Figure 4:
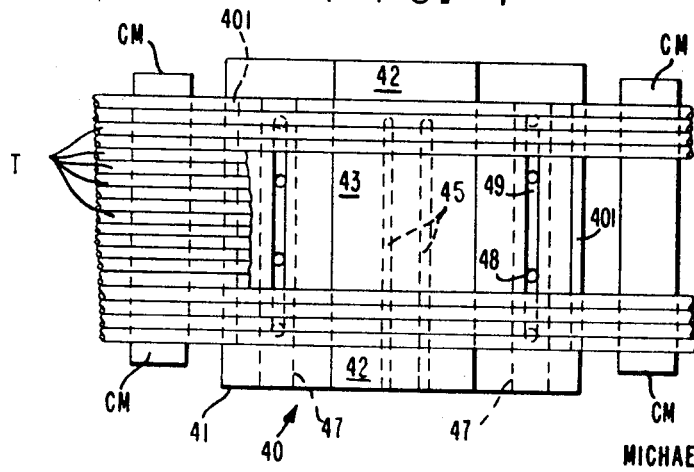
Figure 8:
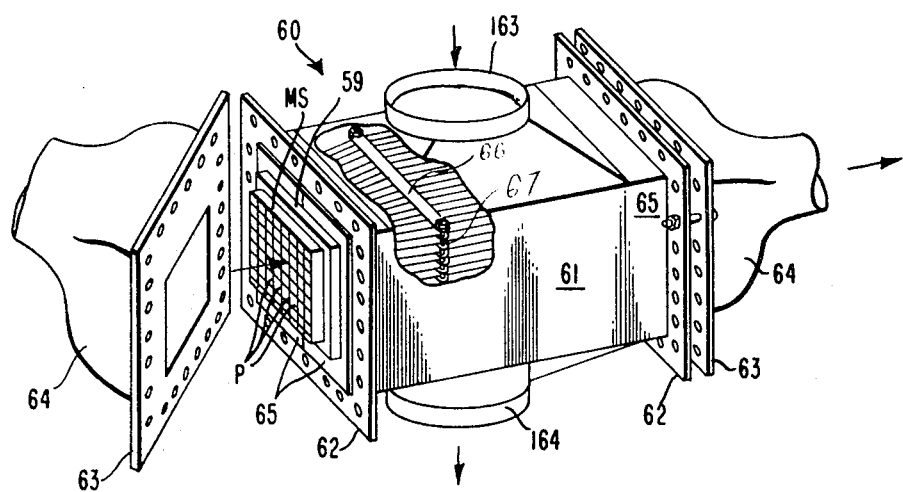
Figure 10:
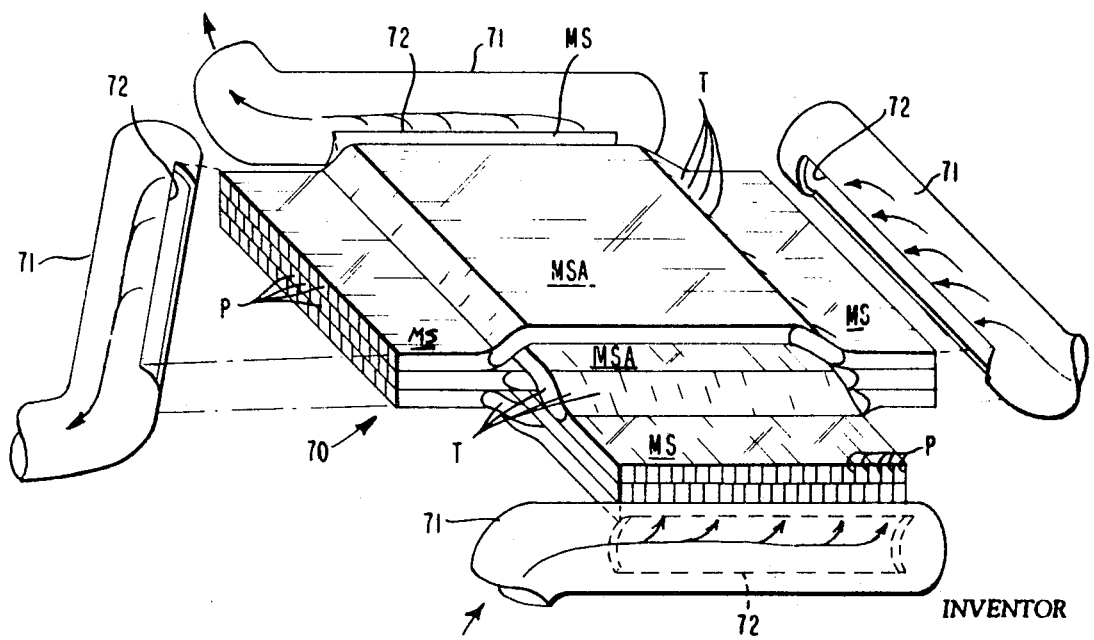
Figure 11:
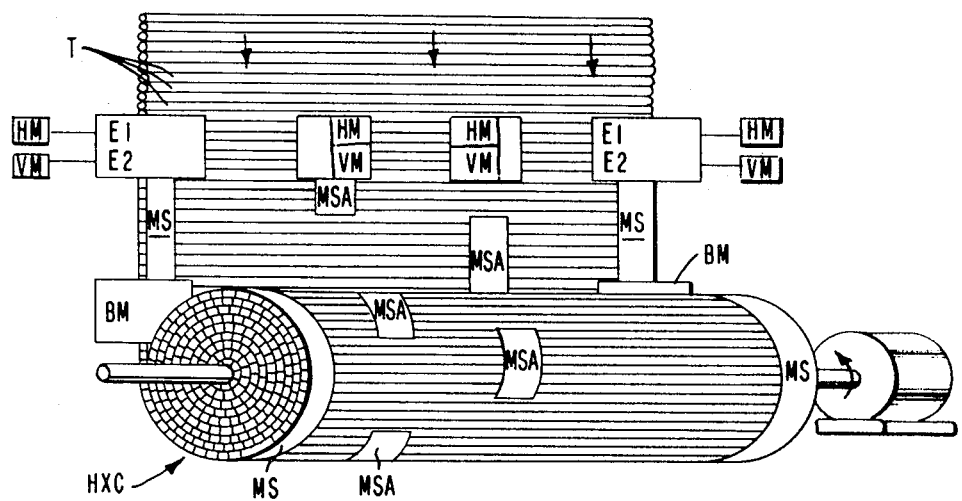
Figure 12:
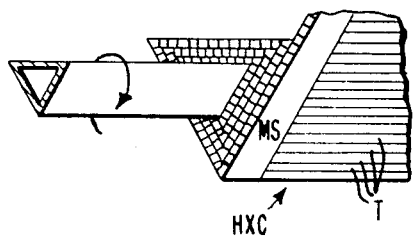
Figure 13:
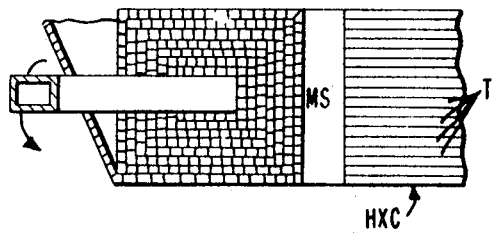

United States Patent

[11] 3,616,021

| [72] | Inventor | Paul Nicholas Valerius<br>Cincinnati, Ohio |
|---|---|---|
| [21] | Appl. No. | 872,356 |
| [22] | Filed | Oct. 29, 1969 |
| [45] | Patented | Oct. 26, 1971 |
| [73] | Assignee | Formica Corporation<br>Cincinnati, Ohio |

[54] PROCESS FOR PREPARING A DECORATIVE LAMINATE SURFACED WITH A TRANSPARENT THERMOPLASTIC FILM
10 Claims, No Drawings

[52] U.S. Cl..................................................... 156/247,
156/228, 156/249
[51] Int. Cl....................................................... B32b 31/04,
B32b 35/00
[50] Field of Search......................................... 156/247,
249, 230, 228, 288

[56] References Cited
UNITED STATES PATENTS

| 3,011,219 | 12/1961 | Williams........................ | 156/247 |
| 3,014,828 | 12/1961 | Reese............................. | 156/247 X |
| 3,078,207 | 2/1963 | Takahashi..................... | 156/247 |
| 3,454,457 | 7/1969 | Hale et al....................... | 156/228 X |

*Primary Examiner*—Carl D. Quarforth
*Assistant Examiner*—Roger S. Gaither
*Attorney*—James T. Dunn

ABSTRACT: A process for preparing a decorative laminate surfaced with a transparent thermoplastic film in which a thermoplastic layer is positioned above the removable release sheet so as to absorb thermal shock stress in high-pressure laminate manufacture.

PATENTED OCT 26 1971

3,616,022

SHEET 1 OF 5

INVENTOR
MICHAEL SOMERVILLE WITHERS

BY

*Harry E. Braddock*
ATTORNEY

PATENTED OCT 26 1971 3,616,022

SHEET 2 OF 5

INVENTOR
MICHAEL SOMERVILLE WITHERS

BY

ATTORNEY

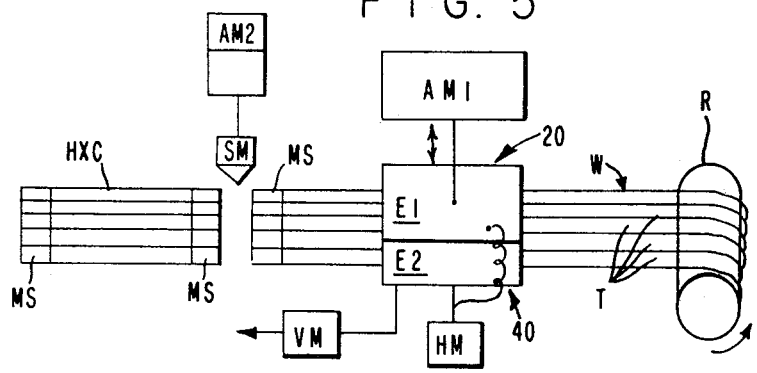
FIG. 5
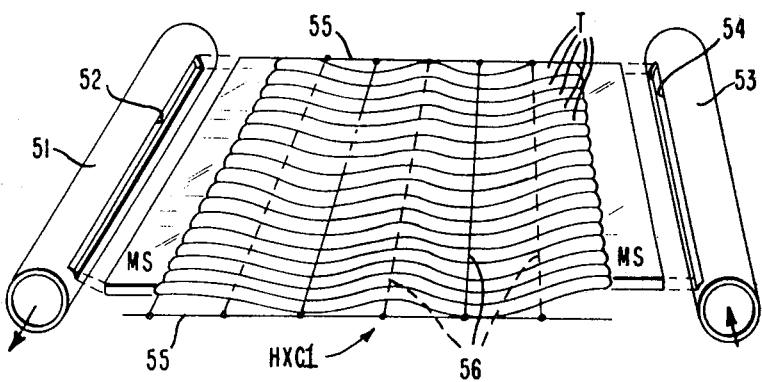
FIG. 6
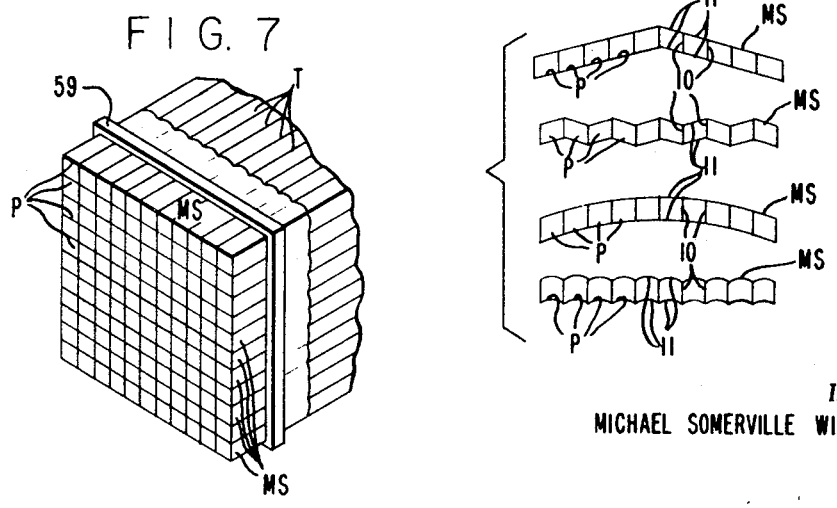
FIG. 7
FIG. 9
INVENTOR
MICHAEL SOMERVILLE WITHERS
BY
ATTORNEY

INVENTOR
MICHAEL SOMERVILLE WITHERS

BY

ATTORNEY

INVENTOR
MICHAEL SOMERVILLE WITHERS

BY

ATTORNEY

PROCESS FOR PREPARING A DECORATIVE LAMINATE SURFACED WITH A TRANSPARENT THERMOPLASTIC FILM

CROSS REFERENCE TO RELATED APPLICATIONS

Reference is made to the U.S. Pat. application having the Ser. No. 649,125, filed on June 27, 1967 in the names of Donald Joseph Albrinck and Ronald James Keeling (Attorney's Docket No. 22,029), and to the U.S. Pat. application having the Ser. No. 780,183, filed on Nov. 29, 1968 in the names of Peter Bernard Kelly and Jay Thomas Oliver (Attorney's Docket No. 22,576).

BACKGROUND OF THE INVENTION

Decorative laminates have been produced for a substantial plurality of years in preparing surface materials for the application to tables, vanitories, vertical wall coverings, door coverings, and the like. Ordinarily, these decorative laminates are prepared by assembling in superimposed relationship a plurality of kraft paper core sheets which have been impregnated with a thermosetting phenol-formaldehyde resin. Superimposed above these core sheets which may number between about 1 and 9 core sheets there is positioned a decorative sheet that is impregnated with a thermosetting resin which does not undergo any noticeable deterioration in color, such as darkening, upon the subsequently applied laminating conditions. Typical resins that meet this description are the melamine-formaldehyde resins, the epoxy resins, the unsaturated polyester resins, the urea resins, and the like. The decorative sheet may be a solid color α-cellulose paper sheet which has been dyed or pigmented to a selected color such as white, pink, yellow, and the like, or the decorative sheet may be a print sheet in which some design such as a geometric design or a floral design or a wood print is imparted to the decorative side of the decorative sheet before or after impregnation with the color stable thermosetting resin. Frequently, there is superimposed above the decorative sheet an overlay sheet which is a sheet of fine quality paper such as α-cellulose paper sheet unpigmented but again impregnated with a color stable thermosetting resin, which overlay sheet is superimposed above the decorative sheet, and then the entire assembly is heat and pressure consolidated under conventional conditions of pressure and temperature to produce a unitary laminated product. The overlay is used primarily when the decorative sheet is a print sheet so as to provide a barrier to avert abrasion of the printed part of the print sheet and thus preserve its printed characteristics intact for prolonged periods of time. Another recent development in the decorative laminate field is the texturing of the laminate by use of a texturing release sheet. More recently, a structure such as that described hereinabove has had the overlay either replaced or additionally surfaced with certain selected thermoplastic films produced from vinyl polymers such as films of poly(methyl methacrylate), blends of poly(methyl methacrylate) with polyvinylidene fluoride, polyvinyl fluoride, polyvinyl chloride and the like. Laminates of this composite type have many attractive features for use in building products and particularly in decorative surfacing products. The bridging of surface irregularities of substrates is an attractive feature of the thermosetting type of plastics while the continuous resin film properties of some thermoplastics give excellent moisture and weather resistance. Attempts to combine the two types of plastics have met with failure on the industrial scale, mainly because of the difference in the thermal stability of the two types of material. The phenomenon of delamination because of thermal shock is most severe in the outside sheets of a press pack of the laminates. The degree of delamination decreases from the outside sheets towards the center of a press pack. Delamination is evident as blisters on the surface or complete separation of the thermoplastic surface from the rest of the laminate. The foregoing fault may be obvious upon inspection of the laminates after the pressing or consolidation under heat and pressure or faulty bonding may be determined by subsequent testing of a sample of the laminate by immersion in boiling water for a prescribed time.

In order to overcome the problem, I have found that by using a thermoplastic film to form a shock absorbing layer for the stress forces exerted by the press plate on the surface of a thermoplastic surfaced laminate during the rapid cool portion of the cure cycle that delamination and blisters are eliminated.

A preferred embodiment is to interpose a polyvinyl chloride film of at least 2 mils thickness as a stress relief sheet and a separator release sheet between the thermoplastic surface of each laminate and the adjacent press plate. It is further theorized that with laminates which show only a moderate degree of delamination on the outside sheets and virtually no delamination of the inside sheets; stress relief sheets may only need to be used on the outside of the pack to obtain complete elimination of the delamination of the problem. The degree of delamination also appears to be related to the thickness of the laminates and the composition of the rest of the laminate besides the thermoplastic surface layer. This relationship may well be applicable to the handling of laminates when the surface layer is markedly different in thermal expansion properties when compared to the rest of the laminate.

1. The Field of the Invention

The concept of the present invention is in the field of making laminated plastic articles and more particularly decorative laminated plastic articles which are permanently surfaced with a transparent film of a thermoplastic material which thermoplastic layer or film becomes securely bonded to the decorative surface and is not subjected to delamination.

2. Description of the Prior Art

The instant Applicant is aware of the Canadian Pat. No. 781,437, issued Mar. 26, 1968 entitled "High Pressure Laminate."

SUMMARY OF THE INVENTION

This invention relates to a process for producing a decorative plastic laminate comprising the steps of:

1. assembling a plurality of kraft paper core sheets impregnated with a thermosetting phenolic resin in superimposed relationship,
2. positioning an α-cellulose paper layer impregnated with from about 60 percent to about 70 percent by weight of a thermosetting melamine-formaldehyde resin having a mol ratio between about 1:1.5 and 1:2.5 melamine to formaldehyde respectively, above said core sheets,
3. positioning above said α-cellulose paper a thermoplastic film,
4. positioning above said film a removable release sheet,
5. positioning above said release sheet a removable film of polyvinyl chloride,
6. applying heat and pressure to the entire assembly so as to consolidate the laminate to a unitary structure while converting the thermosetting resins to the thermoset state in a laminating press,
7. removing the assembly from the press and
8. removing the polyvinyl chloride film and the release sheet from the laminate. The steps 1, 2, 3 and 4 coupled with the steps 6 and 7 are in the domain of the prior art particularly with reference to the related applications identified hereinabove. The thermoplastic transparent film used as the surface layer in the ultimate laminate may be any transparent, colorless or colored thermoplastic film containing no plasticizer or plasticized very lightly with a nonmigratory polymeric plasticizer, including such plasticizers as rubber polymers and copolymers. The essential feature of this thermoplastic film is to impart to the laminate surface a good stain and solvent resistance, but it is equally important that the thermoplastic transparent film be so securely bonded to that layer immediately below it in the laminate that it is not susceptible to delamination. Any film which contains a plasticizer which impairs this stain and solvent resistance is therefore not acceptable. Additionally, any thermoplastic film which is soluble in common solvents to any significant extent, such as alcohols, acetates, carbon tetrachloride and the like is unacceptable. The thickness of the surface film is not critical but economics and commercial availability tend to dictate that the film be selected from those having a thickness between about 0.5 mil and 6 mils and preferably, between about 2 and 4 mils. Illustrative of the type of thermoplastic transparent films which may be used for the surface layer of the laminates of the present invention are polyvinyl chloride films, either plasticized lightly or unplasticized, films of polyacrylonitrile, films of nylon, films of chlorinated polyethers, films of polyesters, films of polycarbonates, films of poly(methyl methacrylate), films of blends of poly(methyl methacrylate) with polyvinylidene fluoride and films of Dupont Surlyn A, a commercially available copolymer of ethylene copolymerized with a monomer containing carboxyl groups to provide an ionically reactive site. One of the preferred vinyl films which may be used to surface the laminate of the present invention is polyvinyl chloride which may be used as a homopolymer or as a copolymer prepared by copolymerizing vinyl chloride with minor amounts such as 15 percent or less of the acrylates such as methacrylates, ethacrylates, propyl acrylates, butyl acrylates, methyl methacrylate, ethyl methacrylate, methylethacrylate, ethylethacrylate, vinyl acetate, vinyl propionate, and the like. These surface films may contain, if desired, small quantities of plasticizer in an amount of 5 percent or less such as a commercially available epoxy, ester-metal salts, urethane extended epoxies and other conventional plasticizers such as dibutyl phthalate, dioctyl phthalate, and the like. Additionally one may use polyvinyl fluoride films and as a preferred embodiment, a film which is a homogeneous blend of polyvinyl fluoride containing uniformly dispersed therein from about 0.1 percent to about 10 percent by weight of a polymer derived from a polymerizable 2-hydroxybenzophenone.

Films of polyvinyl fluoride are recognized for their ability to withstand severe adverse weathering conditions and would be ideally suited for use as the surfacing layer of decorative laminates if it were not for the fact that polyvinyl fluoride, in film form, has a reputation of being a difficulty adherable material in that said polyvinyl fluoride films do not bond readily to substrates even when the film has been pretreated in order to give it an "adherable" characteristic unless specially designed resin adhesive systems are used such as those disclosed and claimed in the U.S. Pat. No. 3,340,137. Even when one takes a film of polyvinyl fluoride that has been pretreated on one side so as to render it more "adherable" and one endeavors to use said treated film to bond to a decorative sheet impregnated with conventional amounts of melamine resin using conventional procedures, one finds that the polyvinyl fluoride film either fails to adhere to the decorative sheet or displays tendencies to delaminate when exposed for even relatively short periods of time to adverse weather or accelerated weather conditions.

Methods of manufacturing polyvinyl fluoride films useful in the present invention are well known in the art and therefore need not be described herein. One such method is that of U.S. Pat. No. 2,953,818, herein incorporated by reference. The various treatments used to render one or both surfaces of polyvinyl fluoride films adherable are also known in the art, e.g., Belgian Pat. Nos. 610,318, 619,638 and 620,723.

Thus, in Belgian Pat. No. 619,638 there is described a method of making one side of a polyvinyl fluoride film adherable without affecting the nonadherability of the other side by passing the film around an electrically grounded rotating drum while the outer face is electrically charged by passage close to a DC electrode, causing the film to adhere strongly to the drum. The film is then passed, in close proximity by a set of tubular electrodes carrying an AC current. Nitrogen is passed through the tubular electrodes and into the space between the electrodes and the drum. The film is then conducted away from the grounded drum. Belgian Pat. No. 620,723 is a variation on the foregoing process and involves exposing the films of polymerized fluorinated hydrocarbons to an electric discharge in an atmosphere having a limited moisture content by passing the film around a grounded rotating drum serving as the negative electrode, with one or more positive electrodes affixed a certain distance from the drum and parallel to its axis of rotation. During this treatment, the atmosphere having limited moisture content is constantly renewed through outlets near the electrodes. For further details see the aforementioned Belgian patents which are herein incorporated by reference.

A convenient method for determining whether a surface of a polyvinyl fluoride film is adherable for the purposes of the present invention is to compare the behavior of an unknown film (X) to the behavior of a film (N) which is known to be nonadherable. Both films are cleaned with a cloth saturated with a solution of 30 percent by weight n-propyl alcohol in water. After allowing the film to dry, a drop of the same solution is squeezed from an eye dropper onto the surface of each film. If the film (X) is adherable, the drop will spread at a rate approximately twice as fast as that on film (N), i.e., the area covered by the drop on film (X) will be twice the area covered on film (N) over the same period of time. For example, after about 10–20 seconds from the time of application of the drop, if both films are nonadherable, the drops will spread at approximately the same rate in each application.

Substantially transparent polyvinyl fluoride films treated to impart adherability on one or both sides may be used. When a film with a single adherable side is employed, the adherable side will, of course, be the side which is bonded to the melamine resin impregnated sheet member.

The U.S. Pat. No. 3,340,137 shows polyvinyl fluoride film on a decorative laminate, and the U.S. Pat. Nos. 2,937,157, 2,904,529, 2,947,723, 2,962,533, 3,173,893, 3,215,665, 3,313,866 and 3,365,421 show polymerizable ultraviolet absorbers and polymers thereof which may be incorporated into the polyvinyl fluoride material to form a film. All of these patents are incorporated herein by reference.

In step number 5 of the process of the present invention, one positions on the texture imparting removable release sheet, a removable film of polyvinyl chloride. This should be at least 2 mils thick and the upper limit of thickness is dictated only by commercial availability and economics. One could use 5, 10 or 25 mil films or thicker if available, but 2 mils to 10 are preferred. The film of the polyvinyl chloride may be either plasticized or unplasticized and the unplasticized is preferred since, although the plasticized types gave good results, as the amount of plasticizer in the film increases so does the difficulty in handling because of sticking.

In order that the concept of the present invention may be more fully understood the following examples are set forth.

EXAMPLE 1

An assembly to be laminated is prepared by making a buildup of six kraft paper sheets which have been impregnated with a thermosetting phenolic resin. On top of the assembly of the kraft paper sheets there is positioned one layer of a melamine-formaldehyde thermosetting resin impregnated α-cellulose printed paper. On top of the print sheet there is positioned a 2 mil rigid (unplasticized) polyvinyl chloride film. On top of the polyvinyl chloride film there is positioned a glassine texturing sheet. A 2 mil film of rigid polyvinyl chloride is positioned between the texturing sheet and the press plate, and the assembly heat and pressure consolidated to a unitary structure. The laminate thus produced shows no evidence of delamination.

EXAMPLE 2

A laminate assembly is prepared by stacking 8 layers of a thermosetting phenol-formaldehyde resin saturated kraft paper sheets onto which is positioned 1 layer of a thermosetting melamine-formaldehyde resin impregnated printed paper sheet, onto which is positioned 1 layer of a thermosetting melamine resin impregnated unpigmented α-cellulose paper which is designed to become the overlay or transparent sheet and onto said overlay sheet there is positioned a commercially available 1 mil (0.001 in.) thick clear polyvinyl fluoride film which contains about 5 percent by weight of a homopolymer of 2-hydroxy-4-acryloxyethoxy benzophenone U.V. stabilizer. Said modified polyvinyl fluoride film has been pretreated so as to make it adherable on the side which contacts the overlay sheet. There is positioned above the modified polyvinyl fluoride film a paper backed aluminum foil texturing release sheet between the laminate surface and the press plate. The entire assembly is then inserted into a press and heat and pressure consolidated to a unitary structure using 1,400 p.s.i. pressure and heating at 160° C. for twenty minutes and then cooling and removing from the press. Varying amounts of delamination of the polyvinyl fluoride film from the rest of the laminate does occur. However, when the entire procedure is repeated and a 2 mil film of rigid polyvinyl chloride is placed between the texturing release sheet and the plate, no delamination of the polyvinyl fluoride film occurs.

EXAMPLE 3

Example 2 is repeated in all essential details except that a 2 mil film of plasticized polyvinyl chloride is used in place of the film of rigid polyvinyl chloride. Excellent results are again obtained with respect to delamination, however the plasticized polyvinyl chloride becomes gummy during the curing cycle and is more difficult and messy to handle. As a consequence, the rigid polyvinyl chloride unplasticized material is preferred.

Press cycles for various types of laminates have been varied in pressure from 600 p.s.i. to 1,400 p.s.i. using such temperatures as from 130° C. to 150° C.

The phenomenon of delamination because of thermal shock is most severe in the outside sheets of a press pack of laminates. The degree of delamination decreases from the outside sheets towards the center of the pack. It is theorized that with laminates which show only a moderate degree of delamination on the outside sheets and virtually no delamination of the inside sheets, stress release sheets may only need to be used on the outside of the pack to obtain complete elimination of the delamination problem. The degree of delamination also appears to be related to the thickness of the laminates and the composition of the rest of the laminate besides the thermoplastic surface layer. This relationship may well be applicable to the handling of laminates where the surface layer is markedly different in thermal expansion properties when compared with the rest of the laminate.

I claim:

1. A process for producing a decorative plastic laminate comprising the steps of:
   1. assembling a plurality of kraft paper core sheets impregnated with a thermosetting phenolic resin in superimposed relationship,
   2. positioning an alpha-cellulose paper layer impregnated with from about 60 percent to about 70 percent by weight of a thermosetting melamine-formaldehyde resin having a mol ratio between about 1:1.5 and 1:2.5 melamine to formaldehyde respectively, above said core sheets,
   3. positioning above said alpha-cellulose paper a thermoplastic film,
   4. positioning above said film a removable release sheet,
   5. positioning above said release sheet a removable film of polyvinyl chloride,
   6. applying heat and pressure to the entire assembly so as to consolidate the laminae to a unitary structure while converting the thermosetting resins to the thermoset state in a laminating press,
   7. utilizing the polyvinyl chloride film as a stress relief sheet for diminishing thermal shock and reducing the tendency of the thermoplastic film to delaminate,
   8. removing the assembly from the press and
   9. removing the polyvinyl chloride film and the release sheet from the laminate.

2. The process according to claim 1 in which the polyvinyl chloride film is unplasticized.

3. The process according to claim 1 in which the polyvinyl chloride film is plasticized.

4. The process according to claim 1 in which a film of a homogeneous blend of polyvinyl fluoride containing uniformly dispersed therein from about 0.1 percent to about 10 percent by weight of a polymer of a polymerizable 2-hydroxy benzophenone is positioned between said melamine formaldehyde resin impregnated sheet and said texture imparting release sheet.

5. The process according to claim 4 in which the polyvinyl chloride film is unplasticized.

6. The process according to claim 4 in which the polyvinyl chloride is plasticized.

7. The process according to claim 1 in which the alpha-cellulosic sheet is the decorative sheet.

8. The process according to claim 4 in which the alpha-cellulosic sheet is the decorative sheet.

9. The process according to claim 1 in which a decorative sheet is positioned immediately below said alpha-cellulose sheet.

10. The process according to claim 4 in which a decorative sheet is positioned immediately below said alpha-cellulose sheet.

* * * * *